United States Patent
Zhang et al.

(10) Patent No.: US 9,122,992 B2
(45) Date of Patent: Sep. 1, 2015

(54) PREDICTING WEB PAGE

(71) Applicant: LENOVO (Singapore) PTE, LTD., New Tech Park (SG)

(72) Inventors: Jianbang Zhang, Raleigh, NC (US); Robert A. Bowser, Cary, NC (US); Jian Li, Chapel Hill, NC (US); John Weldon Nicholson, Cary, NC (US); Matthew Price Roper, Raleigh, NC (US)

(73) Assignee: Lenovo (Singapore) PTE. LTD., Tech Park (SG)

( * ) Notice: Subject to any disclaimer, the term of this patent is extended or adjusted under 35 U.S.C. 154(b) by 198 days.

(21) Appl. No.: 13/712,803

(22) Filed: Dec. 12, 2012

(65) Prior Publication Data

US 2014/0164307 A1    Jun. 12, 2014

(51) Int. Cl.
| | |
|---|---|
| *G06F 17/00* | (2006.01) |
| *G06N 5/02* | (2006.01) |
| *G06N 5/04* | (2006.01) |
| *G06N 99/00* | (2010.01) |
| *G06F 17/30* | (2006.01) |

(52) U.S. Cl.
CPC ............ *G06N 5/04* (2013.01); *G06F 17/30861* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 7,310,632 B2 * | 12/2007 | Meek et al. | 707/709 |
| 8,700,543 B2 * | 4/2014 | Glickman | 706/12 |
| 8,849,694 B1 * | 9/2014 | Chatterjee et al. | 705/14.1 |
| 2008/0126176 A1 * | 5/2008 | Iguchi | 705/10 |
| 2008/0222242 A1 * | 9/2008 | Weiss et al. | 709/203 |
| 2009/0292684 A1 * | 11/2009 | Aggarwal et al. | 707/5 |
| 2010/0023475 A1 * | 1/2010 | Lahav | 706/59 |
| 2011/0082858 A1 * | 4/2011 | Yu et al. | 707/727 |
| 2012/0005192 A1 * | 1/2012 | Bao et al. | 707/721 |
| 2012/0253906 A1 * | 10/2012 | Lapica | 705/14.23 |
| 2013/0060641 A1 * | 3/2013 | Al Gharabally | 705/14.66 |

OTHER PUBLICATIONS

"Disconnection Prediction in Mobile Ad hoc Networks for Supporting Cooperative Work" Fabio De Rosa, Alessio Malizia, and Massimo Mecella Universitá di Roma La Sapienza Published by the IEEE CS and IEEE ComSoc ■ 1536-1268/05/$20.00 © 2005 IEEE.*
"Automatic Prefetching in a WAN" James Griffioen Randy Appleton Department of Computer Science University of Kentucky Lexington, KY 40506 0-8186-5250-0/93 $3.00 0 1993 IEEE.*

* cited by examiner

*Primary Examiner* — Kakali Chaki
*Assistant Examiner* — Luis Sitiriche
(74) *Attorney, Agent, or Firm* — Kunzler Law Group

(57) ABSTRACT

For predicting web pages, a calculation module predicts a web page from a current context and displays the predicted web page.

17 Claims, 6 Drawing Sheets

200

| Viewed Web Page |
| --- |
| 205 |
| Viewed Web Page |
| 205 |
| Viewed Web Page |
| 205 |
| Viewed Web Page |
| 205 |

205

| Viewed Web Page URL |
| --- |
| 210 |
| Viewed Location |
| 212 |
| Viewed Network |
| 214 |
| Viewed Timestamp |
| 216 |
| Viewed Content |
| 218 |
| Bounce Rate |
| 220 |
| Disconnection Time |
| 222 |
| Disconnection Time Interval |
| 224 |

PREDICTING WEB PAGE

BACKGROUND

1. Field

The subject matter disclosed herein relates to web pages and more particularly relates to predicting web page.

2. Description of the Related Art

Web browsers display information located at Universal Resource Locators (URL). Web browsers are often regularly pointed to a few URLs.

BRIEF SUMMARY

Based on the foregoing discussion, the inventors have recognized a need for an apparatus, method, and program product that predict web pages. The apparatus includes a computer readable storage medium, a processor, and the calculation module. The computer readable storage medium stores machine readable code. The processor executes the machine readable code. The calculation module predicts a web page from a current context and displays the predicted web page. The method and the program product also perform the functions of the apparatus.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
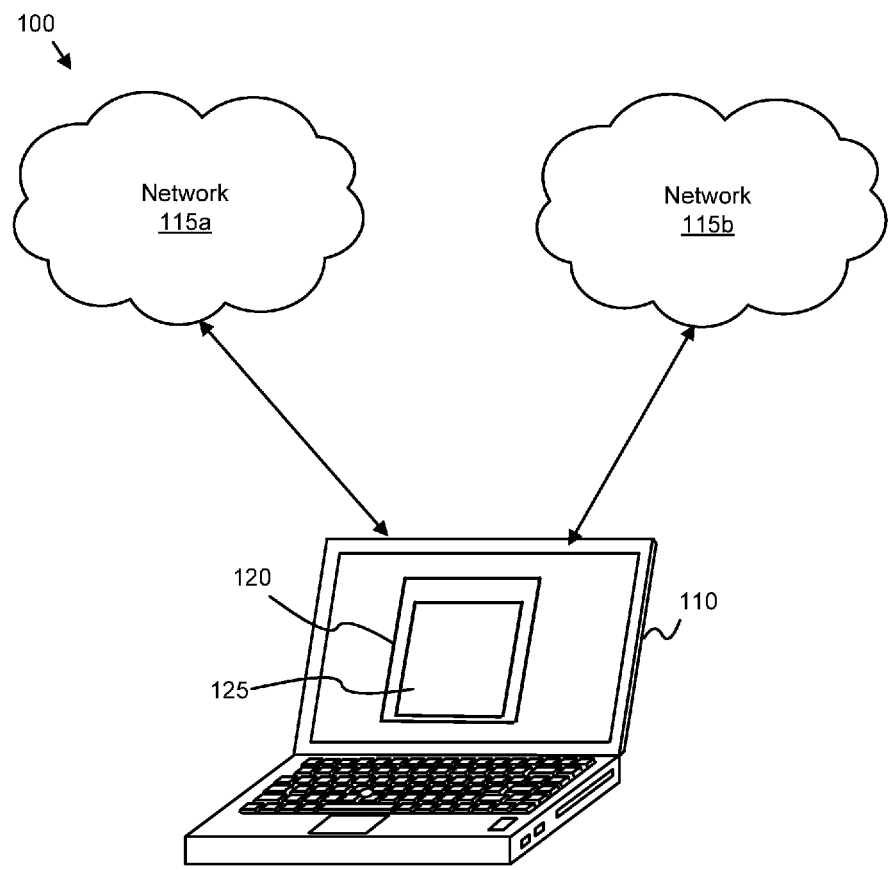
FIG. 1 is a drawing illustrating one embodiment of a browsing system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more machine readable storage devices.

Any combination of one or more computer readable medium may be utilized. The computer readable medium may be a machine readable signal medium or a machine readable storage medium such as a computer readable storage medium. The machine readable storage medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or N flowchart diagrams, and combinations of blocks in the block diagrams and/or flowchart diagrams, can be implemented by special purpose hardware-based systems that perform the specified functions or acts, or combinations of special purpose hardware and machine readable code.

Descriptions of figures may refer to elements described in previous figures, like numbers referring to like elements.

FIG. 1 is a drawing illustrating one embodiment of a browsing system 100. The system 100 includes a computer 110 and one or more networks 115. The computer 110 may be a portable computer such as a laptop, a tablet, a mobile telephone, a personal digital assistant, or the like.

The computer 110 may be used in one or more locations throughout the day to browse web pages on the Internet. In addition, the computer 110 may connect to different networks 115 at different times. The computer 110 may run a browser 120 that browses web pages 125 on the Internet. Web pages that have been viewed using the browser are referred to herein as viewed web pages.

The networks 115 may be wireless networks such as a Wi-Fi network for a mobile telephone network. Alternatively, the networks 115 may be wired networks such as local area networks and wide area networks. The networks 115 may be in communication with the Internet.

A user of the computer 110 may habitually browse certain web pages in certain circumstances. For example, the user may regularly view a sports web page on weekends. The embodiments described herein predict a web page that will be viewed by the user and display the predicted web page to the user as will be described hereafter.

Figure 2:
FIG. 2 is a schematic block diagram illustrating one embodiment of a web page database.

FIG. 2 is a schematic block diagram illustrating one embodiment of a web page database 200. The web page database 200 includes information from a plurality of viewed web pages as viewed web page information 205. In one embodiment, each time a web page 125 is viewed using the computer 110, the viewed web page information 205 may be recorded in the web page database 200. The web page database 200 may be structured as one or more database table, a flat file, a linked list of data structures, or the like. The web page database 200 may be stored on the computer 110. Alternatively, the web page database 200 may be stored remotely.

Figure 3:
FIG. 3 is a schematic block diagram illustrating one embodiment of viewed web page information.

FIG. 3 is a schematic block diagram illustrating one embodiment of viewed web page information 205. The viewed web page information 205 may be the viewed web page information 205 of FIG. 2. In the depicted embodiment, each viewed web page information 205 includes a viewed web page URL 210, a viewed location 212, a viewed network 214, a viewed timestamp 216, viewed content 218, a bounce rate 220, a disconnection time 222, and a disconnection time interval 224.

The viewed web page URL 210 may record the URL of the web page 125 of the viewed web page information 205. The viewed location 212 may record the location of the computer 110 when the web page 125 was viewed using the browser 120. The viewed location 212 may be determined from an observation such as global positioning system coordinates, a network identifier, a network address, and user input.

The viewed network 214 may record the network 115 with which the computer 110 is in communication when the browser 120 views the web page 125. The viewed network 214 may be determined from a network identifier and/or a network address for the network 115.

The viewed timestamp 216 may record a time and/or date when the browser 120 views the web page 125. The viewed content 218 may include keywords from the web page 125. Alternatively, the viewed content 218 may include all content from the web page 125.

The bounce rate 220 may record a percentage of instances where in the user browses the web page 125 without browsing linked content of the web page 125. For example, the bounce rate 220 may record that of 37 times that the web page 125 was viewed by the browser 120, the user directed the browser 120 to browse linked content of the web page 125 35 times for a bounce rate 220 of 5%.

The disconnection time 222 may record one or more times that the computer 110 is disconnected from the network 115. The disconnection time 222 may be used to predict when the computer 110 will be disconnected from the network 115. The disconnection time interval 224 may be an average time interval before and/or after the disconnection time 222 when the computer 110 is typically disconnected from the network 115.

Figure 4:
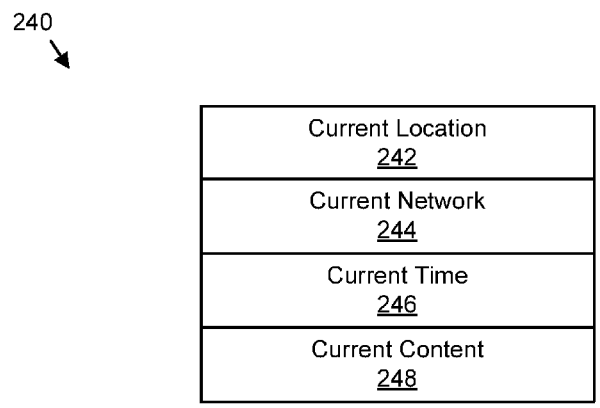
FIG. 4 is a schematic block diagram illustrating one embodiment of current information.

FIG. 4 is a schematic block diagram illustrating one embodiment of current information 240. The current information 240 may be stored on the computer 110. The current information 240 includes a current location 242, the current network 244, a current time 246, and current content 248.

The current location 242 is the location of the computer 110. The current location may be determined from an observation selected from the group consisting of global positioning system coordinates, a network identifier, a network address, and a user input.

The current network 244 identifies each network 115 with which the computer 110 is an active communication. The current network 244 may record a network identifier and/or a network address for the network 115. The current time 246 is the time.

The current content 248 comprises recent content viewed on the computer 110 or portions thereof. For example, the current content 248 may include one or more of a file title, file content, an email, a displayed web page, an application program type, a web page 125, a word processing document, a spreadsheet, an instant messaging application, and a database. In one embodiment, the histogram is created for all word phrases in the current content 248. Alternatively, the current content 248 may be represented by a specified number of frequently used word phrases, ignoring commonly used words. For example, if the phrase "football" is within the 10 most frequently used phrases in the current content 248, the current content 248 may be represented in part by the word phrase "football."

Combinations of the current location 242, the current network 244, the current time 246, and the current content 248 may form a current context. The current context may be selected from the group consisting of the current location 242, the current time 246, and the current content 248. Alternatively, the current context may be selected from the group consisting of the current location 242 and the current time 246. In one embodiment, the current context comprises the current time 246.

In one embodiment, the current context includes a context summary. The context summary may be calculated as a function of the current location 242, the current network 244, the current time 246, and the current content 248. The context summary may be selected from the group consisting of communication, research, drafting, news, sports, leisure, and shopping.

Figure 5:
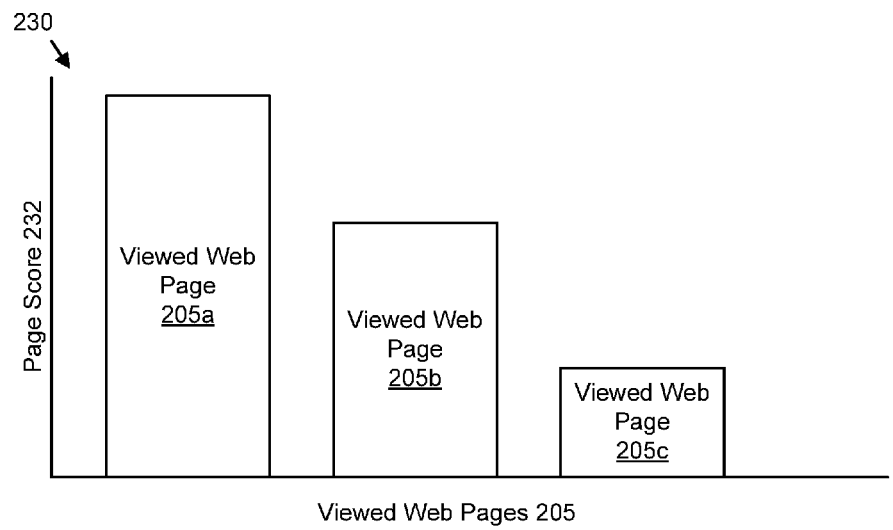
FIG. 5 is a graph illustrating one embodiment of scoring viewed web pages.

FIG. 5 is a graph 230 illustrating one embodiment of scoring viewed web pages 205. The graph 230 shows prophetic examples of page scores 232 for a plurality of viewed web pages 205. The page score PS 232 may be calculated as a function of one or more of a location match LM, a time match TM, and the content match CM. In addition, the page score PS 232 may be calculated as a function of a network match NM. The location match LM may be calculated using Equation 1, where K1 is a non-zero constant, CL is the current location 242, and VL is the viewed location 212.

$$LM = K1/|(CL-VL)| \quad \text{Equation 1}$$

The time match TM may be calculated using Equation 2, where K2 is a non-zero constant, CT is the current time 246, and VT is the viewed timestamp 216.

$$TM = K2/|(CT-VT)| \quad \text{Equation 2}$$

The content match CM may be calculated using Equation 3, where P is a number of instances of each word phrase from the current content 246 in the viewed content 218 and K3 is a non-zero constant.

$$CM=K3*\Sigma P \qquad \text{Equation 3}$$

In one embodiment, the network match NM is calculated using Equation 4, where M indicates a match between the current network 244 and the viewed network 214, and K4 is a non-zero constant.

$$NM=K4*M \qquad \text{Equation 4}$$

In one embodiment, the page score PS 232 is calculated using Equation 5.

$$PS=LM+TM+CM+NM \qquad \text{Equation 5}$$

Alternatively, the page score 232 may be calculated using Equation 6.

$$PS=LM+TM+CM \qquad \text{Equation 6}$$

In one embodiment, the page score 232 is calculated using Equation 7.

$$PS=LM+TM \qquad \text{Equation 7}$$

Alternatively, the page score 232 may be calculated using Equation 8.

$$PS=TM \qquad \text{Equation 8}$$

Figure 6:
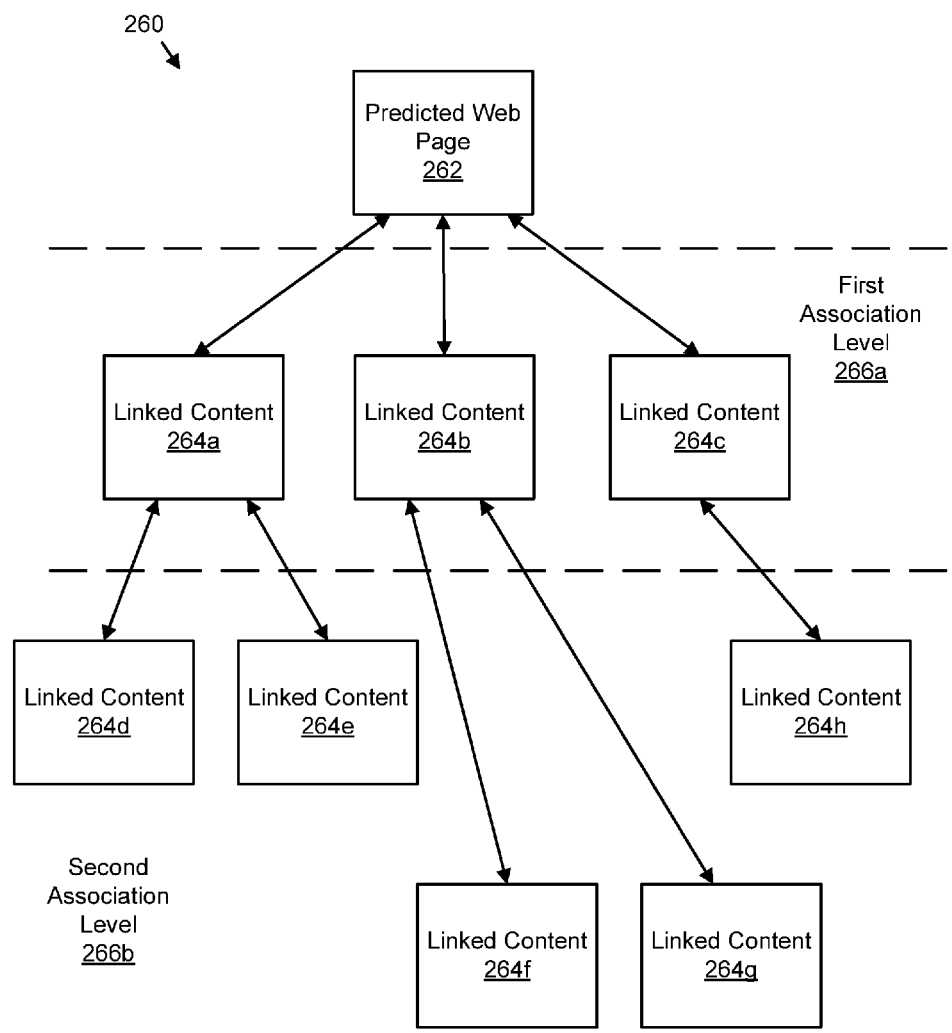
FIG. 6 is a schematic block diagram illustrating one embodiment of web page links.

FIG. 6 is a schematic block diagram illustrating one embodiment of web page links 260. The web page links 260 include a predicted web page 262. The predicted web page 262 contains links to the linked content 264. The links may be hypertext links, scripted links, and/or encoded links. Linked content 264 that is linked directly from the predicted web page 262 has a first association level 266a with the predicted web page 262. Linked content 264 that is linked from linked content 264 with the first association level 266 has a second association level 266b. One of skill in the art will recognize that there may be multiple association levels 266.

Figure 7:
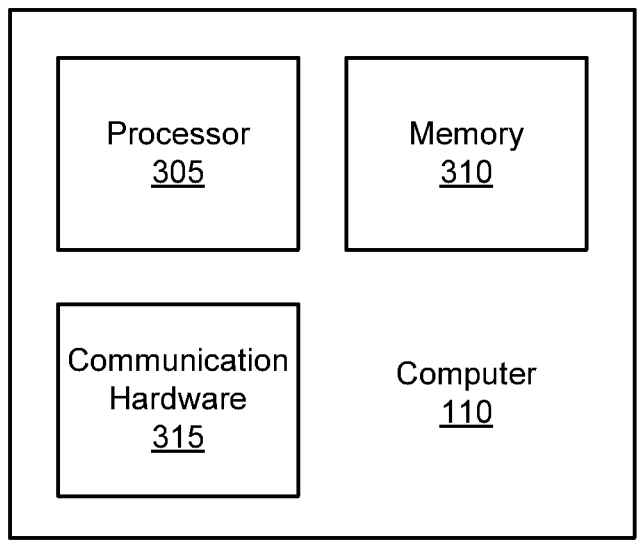
FIG. 7 is a schematic block diagram illustrating one embodiment of computer.

FIG. 7 is a schematic block diagram illustrating one embodiment of computer 110. The computer 110 may be the computer 110 of FIG. 1. The computer 110 may include a processor 305, a memory 310, and communication hardware 315. The memory 310 may be a computer readable storage medium such as a semiconductor storage device, a hard disk drive, an optical storage device, a holographic storage device, a micromechanical storage device, or the combinations thereof. The memory 310 may store machine readable code. The processor 305 may execute the machine readable code. The communication hardware 315 may communicate with other devices.

Figure 8:
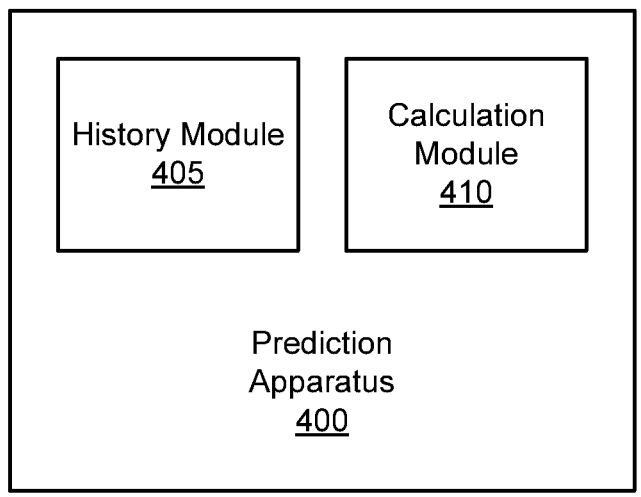
FIG. 8 is a schematic block diagram illustrating one embodiment of a prediction apparatus.

FIG. 8 is a schematic block diagram illustrating one embodiment of a prediction apparatus 400. The apparatus 400 may be embodied in the computer 110. Alternatively, the apparatus 400 may be embodied in a remote server (not shown) in communication with the computer 110 through a network 115. The apparatus 400 includes a history module 405 and the calculation module 410. The history module 405 and the calculation module 410 may be embodied in a computer readable storage medium such as the memory 310 storing machine readable code. The machine readable code may be executed by the processor 305 to perform the functions of the history module 405 and the calculation module 110.

The history module 405 stores the viewed web page information 205 for each web page 125 viewed using the browser 120. The calculation module 410 predicts a web page from the current context and displays the predicted web page 262 as will be described hereafter.

Figure 9:
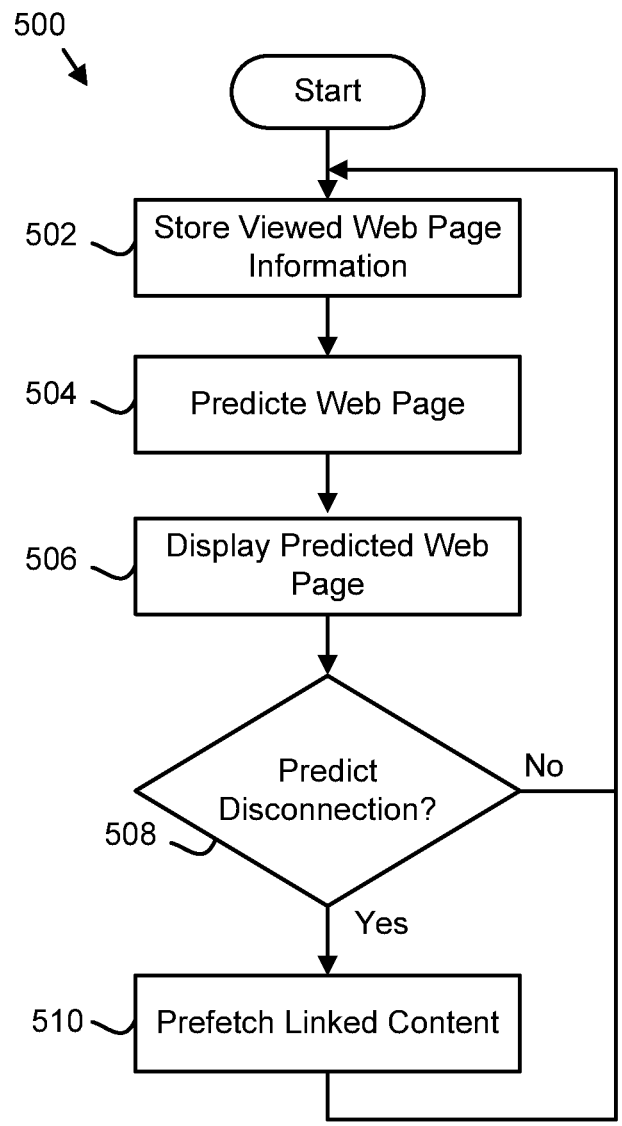
FIG. 9 is a schematic flow chart diagram illustrating one embodiment of a prediction method.

FIG. 9 is a schematic flow chart diagram illustrating one embodiment of a prediction method 500. The method 500 may perform the functions of the apparatus 400 and the system 100. In one embodiment, the method 500 is performed by a computer readable storage medium such as the memory 310. The computer readable storage medium may store machine readable code that when executed by the processor 305 performs the functions of the method 500.

The method 500 starts, and in one embodiment the history module 405 stores 502 the viewed web page information 205 of a viewed web page 125. The history module 405 may store 502 the viewed web page information 205 each time the browser 120 views a web page 125.

The calculation module 410 predicts 504 a web page as the predicted web page 262 from the current context. The calculation module 410 may also predict 504 the predicted web page 262 from the current context and the viewed web page information 205. In one embodiment, the predicted web page 262 is selected from the plurality of viewed web page information 205 in the web page database 200 as having the highest page score 232.

In an alternate embodiment, the calculation module 410 selects a plurality of predicted web pages 262. The plurality of predicted web pages 262 may have the highest page scores 232.

The calculation module 410 may display 506 the predicted web page 262. In one embodiment, the calculation module 410 may display 506 the predicted web page 262 as a web page 125 displayed on the browser 120. Alternatively, the calculation module 410 may display 506 the predicted web page 262 as an option link on the browser 120. A user may select the option link to display 506 the predicted web page 262. The option link may be on a menu of the browser 120. Alternatively, the option link may embedded in a web page 125.

In one embodiment, the calculation module 410 displays 506 the plurality of predicted web pages 262 by displaying the thumbnail of each of the plurality of predicted web pages 262 on a single web page 125. Alternatively, the plurality of predicted web pages 262 may be displayed as a plurality of option links.

By predicting 504 the predicted web page 262 from the current context and displaying the predicted web page 262, the method 500 facilitates a user employing the computer 110 and browser 120 to view the predicted web page 262. A different predicted web page 262 may be displayed 506 at each time depending on the time of the day and the location. For example, a predicted web page 262 such as a news web page may be displayed between 7 and 8 a.m. while a stock market predicted web page 262 may be displayed between 10 and 11 a.m. In an alternate example, a sports predicted web page 262 may be displayed when the computer 110 is in a coffee shop while an enterprise database predicted web page 262 may be displayed while a computer 110 is in a boardroom. Thus the predicted web page 262 is matched to the user's browsing habits.

The calculation module 410 may further predict 508 a disconnection of the computer 110 from a network 115. The predicted 508 disconnection may be determined by a comparison of the current time 246 to the disconnection time 222. In one embodiment, the disconnection is predicted 508 if the current time 246 is within the disconnection time interval 224 of the disconnection time 222. Alternatively, the disconnection may be predicted 508 from a signal strength of a network 115. For example, if the signal strength of the network 115 falls below a strength threshold, the calculation module 410 may predict 508 a disconnection of the computer 110 from the network 115.

If the calculation module 410 does not predict the disconnection of the computer 110 from the network 115, the history module 405 may continue to store 502 the viewed web page information 205 from viewed web pages. If the calculation module 410 does predict the disconnection of the computer 110 from the network 115, the history module 405 prefetches 510 linked content 264 that is links to the predicted web page 262.

In one embodiment, the history module 405 prefetches 510 a first association level 266a of linked content 264. Alternatively, the history module may prefetch a first and second association levels 266a-b of the linked content 264. The prefetched linked content 264 may be stored on the computer 110 for later browsing.

By prefetching 510 the linked content 264, the method 500 assures that the user may browse the linked content 264 of the predicted web page 262 even after the computer 110 is disconnected from the network 115. Thus the user's browsing experience may be uninterrupted.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a computer readable storage medium storing machine readable code; and
   a processor executing the machine readable code, the machine readable code comprising:
   a calculation module predicting a web page from a current context comprising a current physical location of the apparatus and a current time that the apparatus is being used, wherein the predicted web page is selected from a plurality of previously viewed web pages as having a highest page score, where each page score is calculated based on a combination between a location match with a time match, the location match is calculated as a function of the current physical location of the apparatus and a viewed location for each previously viewed webpage, and the time match is calculated as a function of the current time that the apparatus is being used and a viewed time for each previously viewed web page; and
   displaying the predicted web page.

2. The apparatus of claim 1, wherein the current context further comprises a current content.

3. The apparatus of claim 1, the machine readable code further comprising a history module storing the viewed web page information.

4. The apparatus of claim 1, the calculation module further prefetching linked content that is linked to the predicted web page in response to a predicted disconnection from a network.

5. A method comprising:
   predicting, by the use of a processor, a web page from a current context comprising a current physical location of a device and a current time that the device is being used, wherein the predicted web page is selected from a plurality of previously viewed web pages as having a highest page score, where each page score is calculated based on a combination between a location match with a time match, the location match is calculated as a function of the current physical location of the device and a viewed location for each previously viewed webpage, and the time match is calculated as a function of the current time that the device is being used and a viewed time for each previously viewed web page; and
   displaying the predicted web page.

6. The method of claim 5, wherein the current context further comprises a current content.

7. The method of claim 6, wherein the current location is determined from an observation selected from the group consisting of global positioning system coordinates, a network identifier, a network address, and a user input.

8. The method of claim 6, wherein the current content comprises one or more of a file title, file content, an email, a displayed web page, and an application program type.

9. The method of claim 5, further comprising storing the viewed web page information and wherein the predicted web page is selected from a plurality of viewed web pages as having the highest page score calculated from the viewed web page information and the current context.

10. The method of claim 9, wherein the page score is calculated as a function of the location match, the time match, and a content match.

11. The method of claim 9, wherein the viewed page information comprises a viewed web page, a viewed location, a viewed network, a viewed timestamp, viewed content and a bounce rate.

12. The method of claim 5, further comprising prefetching linked content that is linked to the predicted web page.

13. The method of claim 12, wherein the linked content is prefetched in response to a predicted disconnection from a network.

14. A computer program product comprising a non-transitory computer readable storage medium storing machine readable code executed by a processor to perform the operations of:
   predicting a web page from a current context comprising a current physical location of a device and a current time that the device is being used, wherein the predicted web page is selected from a plurality of previously viewed web pages as having a highest page score, where each page score is calculated based on a combination between a location match with a time match, the location match is calculated as a function of the current physical location of the device and a viewed location for each previously viewed webpage, and the time match is calculated as a function of the current time that the device is being used and a viewed time for each previously viewed web page; and
   displaying the predicted web page.

15. The program product of claim 14, wherein the current context further comprises a current content.

16. The program product of claim 15, wherein the linked content is prefetched in response to a predicted disconnection from a network.

17. The program product of claim 14, further comprising prefetching linked content that is linked to the predicted web page.

* * * * *